United States Patent
Lee et al.

(10) Patent No.: US 7,743,613 B2
(45) Date of Patent: Jun. 29, 2010

(54) COMPOUND TURBINE COOLED ENGINE

(75) Inventors: Ching-Pang Lee, Cincinnati, OH (US); Thomas Ory Moniz, Loveland, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 858 days.

(21) Appl. No.: 11/595,668

(22) Filed: Nov. 10, 2006

(65) Prior Publication Data

US 2008/0112791 A1 May 15, 2008

(51) Int. Cl.
*F02C 6/08* (2006.01)
(52) U.S. Cl. ......................... 60/782; 415/115
(58) Field of Classification Search ............... 60/782, 60/785, 39.83, 806; 415/115, 116, 175, 176, 415/177, 178, 179; 416/95, 96 R, 97 R
See application file for complete search history.

(56) References Cited

U.S. PATENT DOCUMENTS

| | | | |
|---|---|---|---|
| 3,034,298 A | 5/1962 | White | |
| 4,080,785 A | 3/1978 | Koff et al. | |
| 4,741,153 A | 5/1988 | Hallinger et al. | |
| 5,134,844 A | 8/1992 | Lee et al. | |
| 5,135,354 A | 8/1992 | Novotny | |
| 5,142,859 A * | 9/1992 | Glezer et al. | 60/806 |
| 5,232,339 A | 8/1993 | Plemmons et al. | |
| 5,288,210 A | 2/1994 | Albrecht et al. | |
| 5,472,313 A | 12/1995 | Quinones et al. | |
| 5,555,721 A | 9/1996 | Bourneuf et al. | |
| 5,611,197 A * | 3/1997 | Bunker | 60/806 |
| 5,996,331 A | 12/1999 | Palmer | |
| 6,050,079 A | 4/2000 | Durgin et al. | |
| 6,183,193 B1 | 2/2001 | Glasspoole et al. | |
| 6,331,097 B1 | 12/2001 | Jendrix | |
| 6,487,863 B1 | 12/2002 | Chen et al. | |
| 6,923,247 B1 | 8/2005 | Ferber et al. | |
| 6,960,060 B2 | 11/2005 | Lee | |
| 6,981,841 B2 | 1/2006 | Krammer et al. | |
| 2005/0111964 A1 | 5/2005 | Krammer et al. | |

OTHER PUBLICATIONS

General Electric Company, "CF6-80C2 Engine Airflow FADEC Control," Engine in public use and on sale in US more than one year before Sep. 1, 2006, single page.
General Electric Company, "CFM56-5C2-CDP Air for Turbine Cooling," Engine in public use and on sale in US more than one year before Sep. 1, 2006, two pages.
U.S. Appl. No. 11/595,606, filed Nov. 10, 2006, by Ching-Pang Lee et al.
U.S. Appl. No. 11/595,670, filed Nov. 10, 2006, by Ching-Pang Lee et al.
U.S. Appl. No. 11/595,669, filed Nov. 10, 2006, by Ching-Pang Lee et al.

* cited by examiner

*Primary Examiner*—Michael Cuff
*Assistant Examiner*—Andrew Nguyen
(74) *Attorney, Agent, or Firm*—William S. Andes; Francis L. Conte

(57) ABSTRACT

A gas turbine engine includes a compressor, combustor, and high pressure turbine operatively joined together. The turbine includes a row of nozzle vanes followed by a row of rotor blades. The vanes and blades have corresponding forward and aft internal cooling channels. First, second, third, and fourth bleed circuits are joined in flow communication with different stages of the compressor for bleeding pressurized air therefrom at different pressures to provide coolant to the forward and aft channels of the turbine vanes and blades.

24 Claims, 5 Drawing Sheets

COMPOUND TURBINE COOLED ENGINE

BACKGROUND OF THE INVENTION

The present invention relates generally to gas turbine engines, and, more specifically, to turbine cooling therein.

In a gas turbine engine, air is pressurized in a compressor and mixed with fuel in a combustor for generating hot combustion gases. Energy is extracted from the combustion gases in turbine stages which power the compressor through one drive shaft, and produce additional work for powering an upstream fan in a turbofan aircraft engine application, or driving an external drive shaft for marine and industrial (M&I) applications.

The basic core engine typically includes a multistage axial compressor having rows of compressor blades and corresponding guide vanes which pressurize ambient air in stages and correspondingly increase the temperature thereof. The air discharged from the aft end of the compressor has the highest pressure, commonly referred to as compressor discharge pressure (CDP), and a correspondingly high temperature.

In an exemplary configuration, the compressor may have seven stages for increasing air pressure many times atmospheric pressure along with many hundreds of degrees of temperature increase due to the compression cycle. A fewer or greater number of compression stages may be used as desired for the specific design of the gas turbine engine and its intended use.

A majority of the CDP air discharged from the compressor is mixed with fuel in the combustor for generating hot combustion gases. These combustion gases then undergo an expansion cycle in the several turbine stages for extracting energy therefrom which correspondingly reduces the pressure of the combustion gases and the temperature thereof. A high pressure turbine (HPT) immediately follows the combustor and is used to power the compressor blades in the core engine.

A low pressure turbine (LPT) follows the HPT and drives the second shaft for powering the upstream fan in the turbofan engine application, or driving an external drive shaft for M&I applications.

The overall efficiency of the gas turbine engine is dependent on the efficiency of air compression, efficiency of combustion, and efficiency of combustion gas expansion in the turbine stages.

Since turbine components are directly exposed to hot combustion gases during operation, they require suitable cooling thereof to ensure long useful life. For example, some of the compressor discharge air is diverted from the combustion process for cooling liners of the combustor itself, as well as cooling various components of the HPT.

Each turbine stage typically includes an upstream turbine nozzle or stator having a row of nozzle vanes which direct the combustion gases downstream through a corresponding row of turbine rotor blades. The blades are typically mounted to the perimeter of a supporting rotor disk in corresponding dovetail slots formed therein.

The turbine blades and vanes are typically hollow airfoils with corresponding internal cooling channels therein which receive compressor discharge air for cooling thereof during operation. The hollow blades and vanes typically include various rows of film cooling and other discharge holes through the pressure and suction sidewalls thereof for discharging the spent internal cooling air in corresponding external films for further protecting the airfoils.

Furthermore, the turbine rotor disk which supports the first stage turbine blades is a relatively large component with a rim in which the blades are mounted, a narrow web extending radially inwardly therefrom which terminates in a wider hub having a central bore. The rotor disk is subject to both considerable centrifugal loads and heating during operation and must also be designed for long life.

In contrast, the LPT requires less cooling than the HPT in view of the reduction in combustion gas temperature and pressure during the expansion cycle. The cooling requirements are therefore reduced, and typically interstage bleed air may be used for cooling various components therein.

The main turbine flowpath is designed to confine the combustion gases as they flow through the engine and decrease in temperature and pressure from the combustor. The various cooling circuits for the turbine components are independent from the main flowpath and must be provided with cooling air at sufficient pressure to prevent ingestion of the hot combustion gases therein during operation.

For example, suitable rotary seals are provided between the stationary turbine nozzles and the rotating turbine blades to prevent ingestion or back flow of the hot combustion gases into the cooling circuits. Since the airfoils of the nozzle vanes and turbine blades typically include rows of cooling air outlet holes, the cooling air must have sufficient pressure greater than that of the external combustion gases to provide a suitable backflow margin to prevent ingestion of the hot combustion gases into the turbine airfoils themselves.

Accordingly, the components of the HPT are typically cooled using the full-pressure CDP air, whereas LPT components may be cooled using lower pressure, interstage bleed air.

In this way, the use of compressor air for cooling turbine components may be matched to the different cooling requirements of the HPT and the LPT for reducing the use thereof and therefore increasing engine efficiency.

However, increasing engine efficiency is a continuing and paramount design objective in modern gas turbine engines, and it is therefore desired to further increase engine efficiency by reducing pressurized air extracted from the compressor.

BRIEF DESCRIPTION OF THE INVENTION

A gas turbine engine includes a compressor, combustor, and high pressure turbine operatively joined together. The turbine includes a row of nozzle vanes followed by a row of rotor blades. The vanes and blades have corresponding forward and aft internal cooling channels. First, second, third, and fourth bleed circuits are joined in flow communication with different stages of the compressor for bleeding pressurized air therefrom at different pressures to provide coolant to the forward and aft channels of the turbine vanes and blades.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
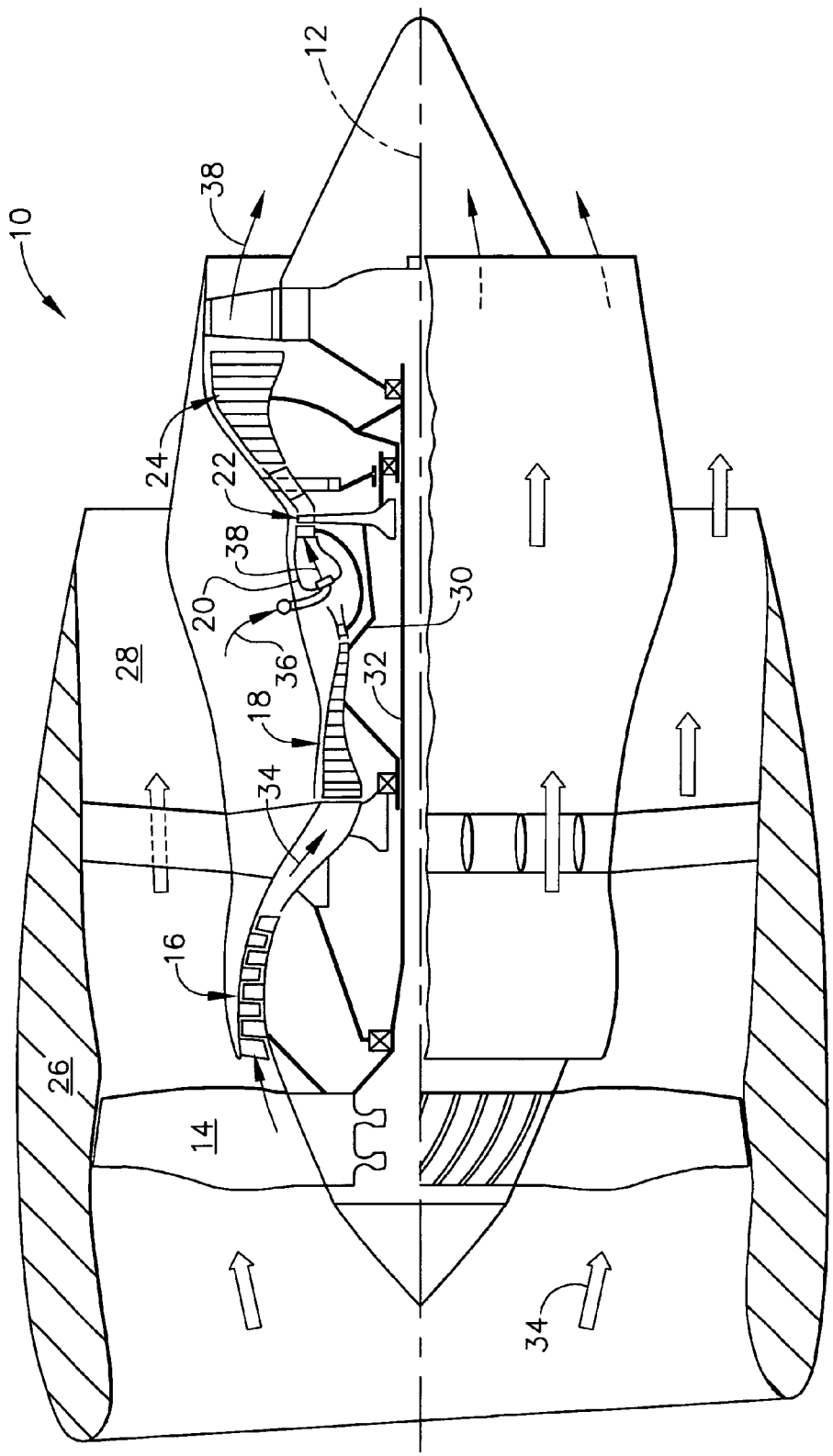
FIG. 1 is a partly sectional, axial schematic view of a turbofan gas turbine engine.

Illustrated schematically in FIG. 1 is an exemplary turbofan aircraft gas turbine engine 10. The engine is axisymmetrical about a longitudinal or axial centerline axis 12 and is suitably mounted to the wing or a fuselage of an aircraft (not shown) for powering an aircraft in flight in an exemplary application.

The engine includes in serial flow communication a fan 14, a low pressure or booster compressor 16, a high pressure (HP) compressor 18, an annular combustor 20, a high pressure turbine (HPT) 22, and a low pressure turbine (LPT) 24.

An annular nacelle 26 surrounds the fan 14 and defines an annular bypass duct 28 extending aft around the booster compressor 16. A first drive shaft 30 joins the HPT 22 to the HP compressor 18, and a second drive shaft 32 joins the LPT 24 to the fan 14 and booster compressor 16. The two drive shafts are suitably mounted in bearings in corresponding frames within the engine in a conventional configuration of the various engine components described above.

During operation, ambient air 34 enters the inlet of the engine and is pressurized in part by the fan 14 and discharged through the bypass duct 28 for providing a majority of propulsion thrust during operation. Some of the air 34 passing the fan enters the booster compressor 16 and undergoes a further compression cycle in the multiple axial stages thereof, with additional compression also being provided in the HP compressor 18 in the multiple axial stages thereof.

The pressurized air 34 is discharged from the compressor and suitably mixed with fuel 36 in the combustor 20 for generating hot combustion gases 38. Energy is extracted from the combustion gases 38 in the HPT 22 to drive the first shaft 30 and power the HP compressor 18. Additional energy is extracted from the combustion gases in the LPT 24 to drive the second shaft 32 and power the fan 14 and booster compressor 16.

The engine as described above is conventional in configuration and operation and includes multiple compression stages and multiple turbine stages. For example, the booster compressor 16 may have four axial stages including four rows of compressor blades alternating axially with four rows of inlet guide vanes.

Figure 2:
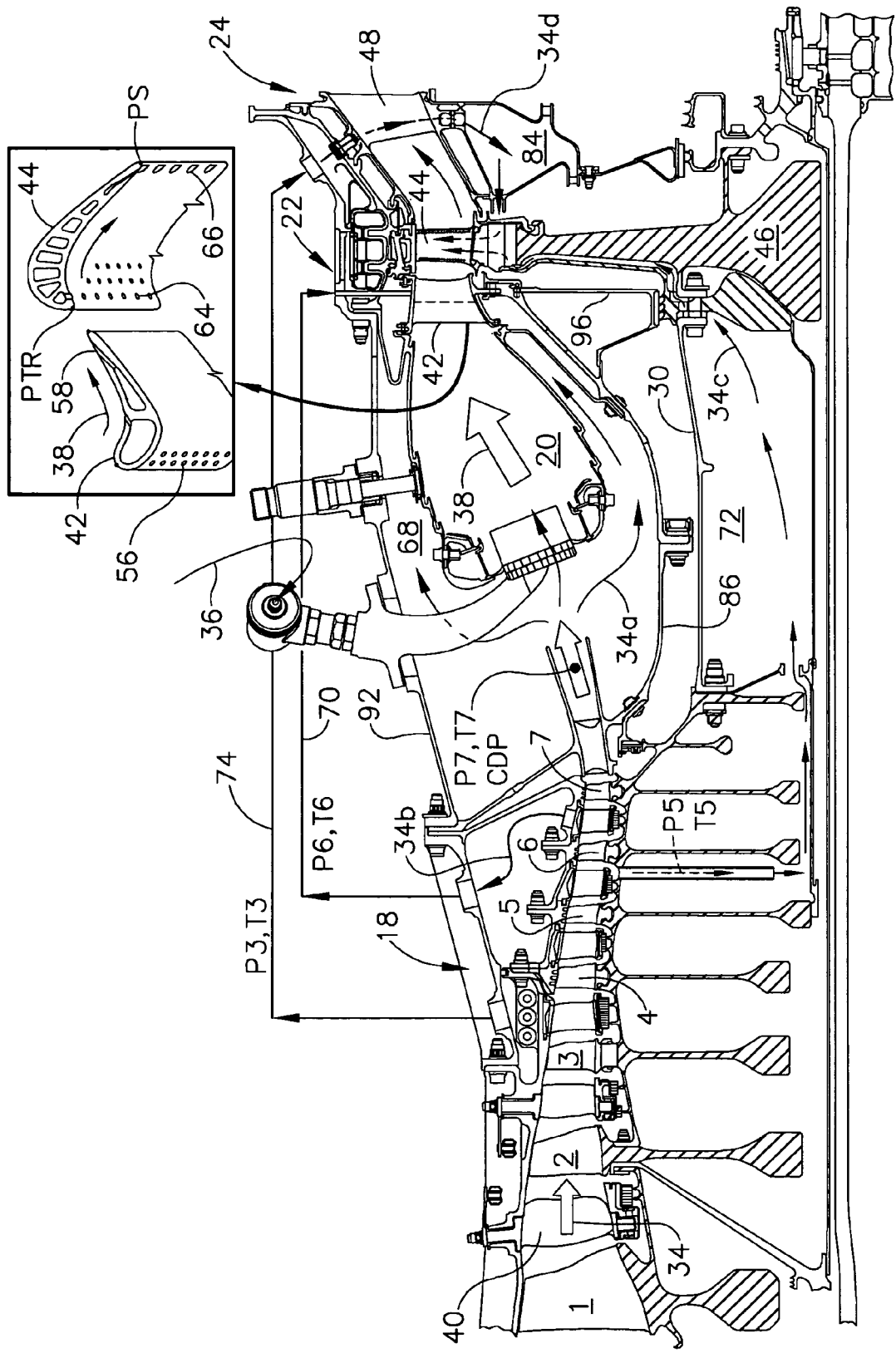
FIG. 2 is an enlarged, axial sectional view through a portion of the core engine illustrated in FIG. 1.

The high pressure compressor 18 may include seven axial stages for example, having seven rows of compressor blades 1-7 as shown in detail in FIG. 2 alternating axially with corresponding rows of inlet guide vanes 40.

The HPT 22 is preferably a single stage turbine followed in turn by an exemplary five stage LPT 24.

FIG. 2 illustrates in more detail the basic core engine including the high pressure compressor 18, annular combustor 20, and HPT 22 disposed in serial flow communication.

Figure 3:
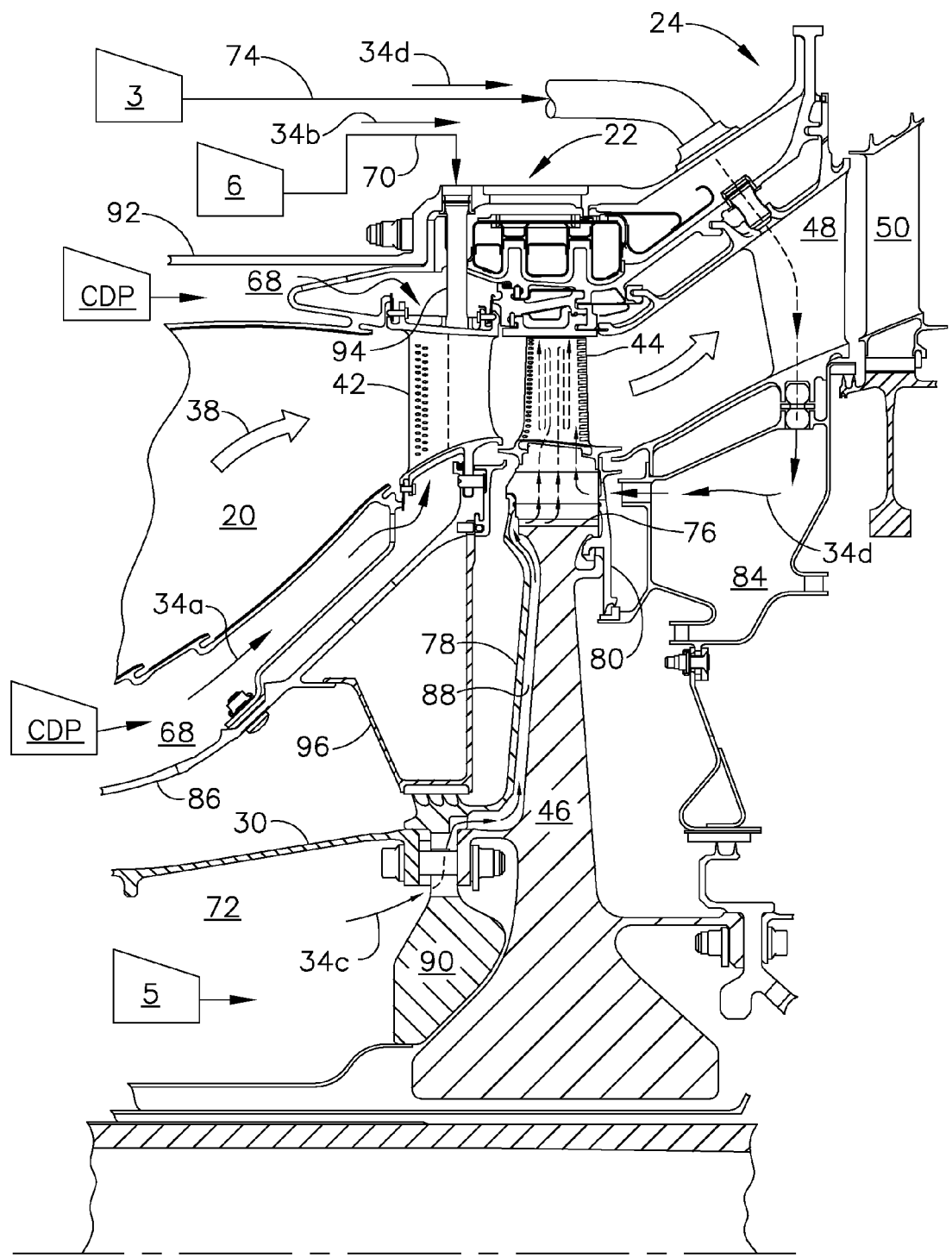
FIG. 3 is an enlarged, axial sectional view of the high pressure turbine illustrated in FIG. 2.
Figure 4:
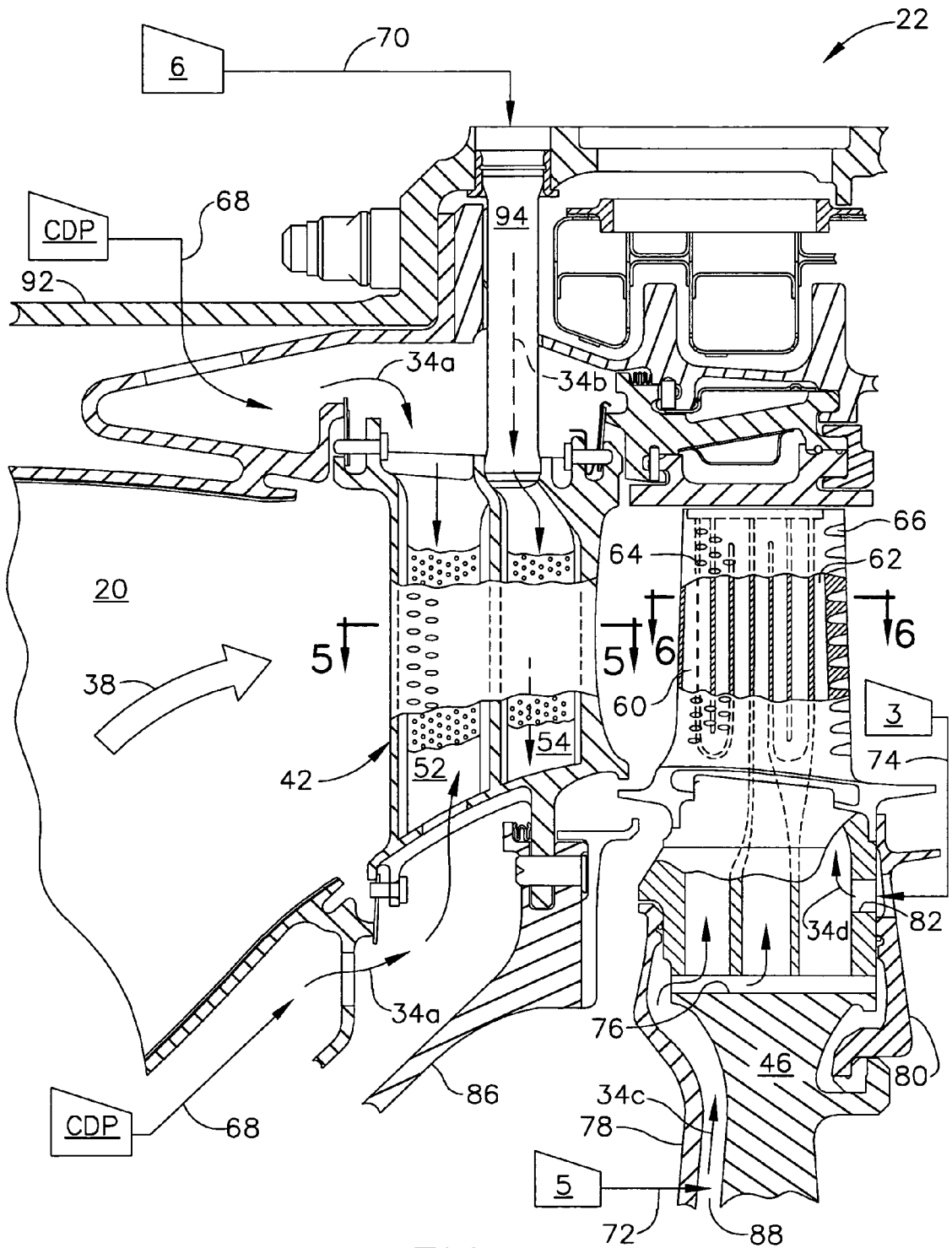
FIG. 4 is a further enlarged, axial sectional view of the high pressure turbine shown in FIG. 3.

FIGS. 3 and 4 illustrate further enlarged views of the high pressure turbine and the corresponding cooling circuits for the vanes and blades thereof.

The HPT 22 illustrated in FIG. 2 includes a first stage or HP turbine nozzle having a row of stator nozzle vanes 42 suitably mounted in outer and inner bands. Following the vanes is a single row of HP turbine blades 44 removably mounted to the perimeter or rim of a first stage or HP rotor disk 46. The disk 46 is fixedly joined to the first drive shaft 30 which in turn is fixedly joined to the rotor disks supporting the compressor blades 1-7 of the high pressure compressor 18.

The LPT 24 illustrated in FIGS. 2 and 3 follows the HPT 22 in serial flow communication. The LPT has several stages as desired including a first stage LP nozzle having a row of stator nozzle vanes 48 which directly follow the row of HP blades 44.

The LP vanes 48 are mounted between radially inner and outer annular bands. And, a row of first stage LP rotor blades 50 follows the stator vanes 48, and extend radially outwardly from a supporting rotor disk in a conventional manner.

The configuration and operation of the HP compressor 18, HPT 22, and LPT 24 are conventional for pressurizing the air 34 and expanding the subsequent combustion gases 38 for extracting energy therefrom. In particular, the pressure and temperature of the air 34 increases axially in turn as the air flows downstream through the seven stages of compressor blades 1-7.

The seventh row of compressor blades 7 defines the last stage of the compressor in this exemplary configuration and discharges the pressurized air at a maximum pressure P7 and a correspondingly high temperature T7 associated with the compressor discharge pressure (CDP) air 34a.

The CDP air is mixed with the fuel in the combustor to generate the hot combustion gases 38 which are discharged from the outlet of the combustor between the first stage turbine nozzle vanes 42. These vanes are disposed axially between the combustor and the first stage turbine blades 44 and are conventionally configured for dropping or reducing the pressure in the combustion gases along the airfoil chord and across the leading and trailing edges of the vanes.

Each nozzle vane 42 has the typical generally concave pressure side and generally convex opposite suction side extending axially in chord between the upstream leading edge and the downstream trailing edge. The contour of the nozzle vanes 42 may be suitably selected to effect a substantial pressure drop as the combustion gases flow downstream between the inlet and outlet ends of the turbine nozzle. Gases flowing through a turbine nozzle are accelerated and turned which causes a small drop in total pressure and a large drop in static pressure.

Correspondingly, the first stage turbine blades 44 illustrated in FIG. 2 have the generally concave pressure side and generally convex opposite suction side extending axially between the leading and trailing edges thereof. The profile of the turbine blades 44 is also conventionally selected for additionally dropping or reducing pressure of the combustion gases 38 along the airfoil chord and across the leading and trailing edges thereof. Work or energy is extracted from the gases flowing between turbine rotor blades which causes a large drop in both total pressure and static pressure.

FIGS. 3 and 4 illustrate the HPT 22 in more detail, including the HP vanes 42 and blades 44 which both require suitable cooling from the hot combustion gases 38 during operation. The vanes and blades are typically hollow for providing internal cooling thereof in a conventional manner, except as modified hereinbelow.

Figure 5:
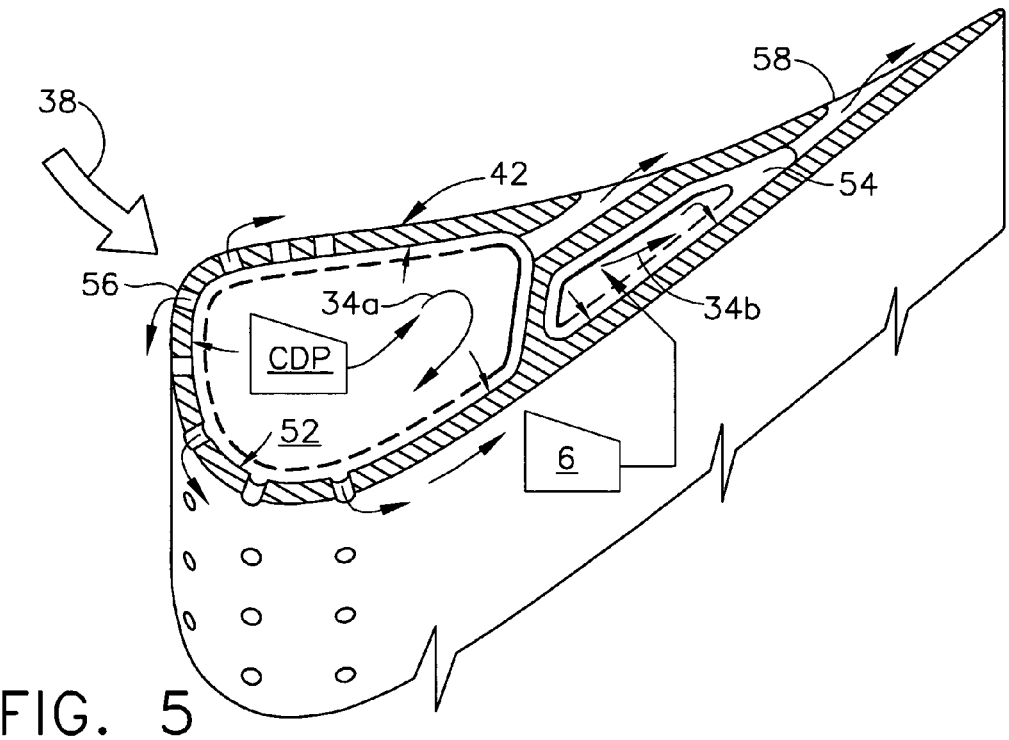
FIG. 5 is a radial sectional view through one of the nozzle vanes illustrated in FIG. 4 and taken along line 5-5.

More specifically, each of the nozzle vanes 42 illustrated in FIGS. 4 and 5 includes a forward cooling channel 52 extending radially in span between the outer and inner bands of the nozzle and separated by an imperforate partition or septum from an aft cooling channel 54 also extending radially between the two bands. The forward channel 52 feeds a row of film cooling holes 56 extending along the leading edge of the vane, as well as additional rows of film cooling holes on the opposite sides of the vane along its forward portion.

Correspondingly, the aft cooling channel 54 in each vane feeds a row of additional cooling holes 58 extending through the airfoil pressure side and terminating closely adjacent to the thin trailing edge. These several rows of outlet holes extend through the pressure and suction sides of the vane from leading to trailing edge for discharging spent cooling air therefrom during operation.

Figure 6:
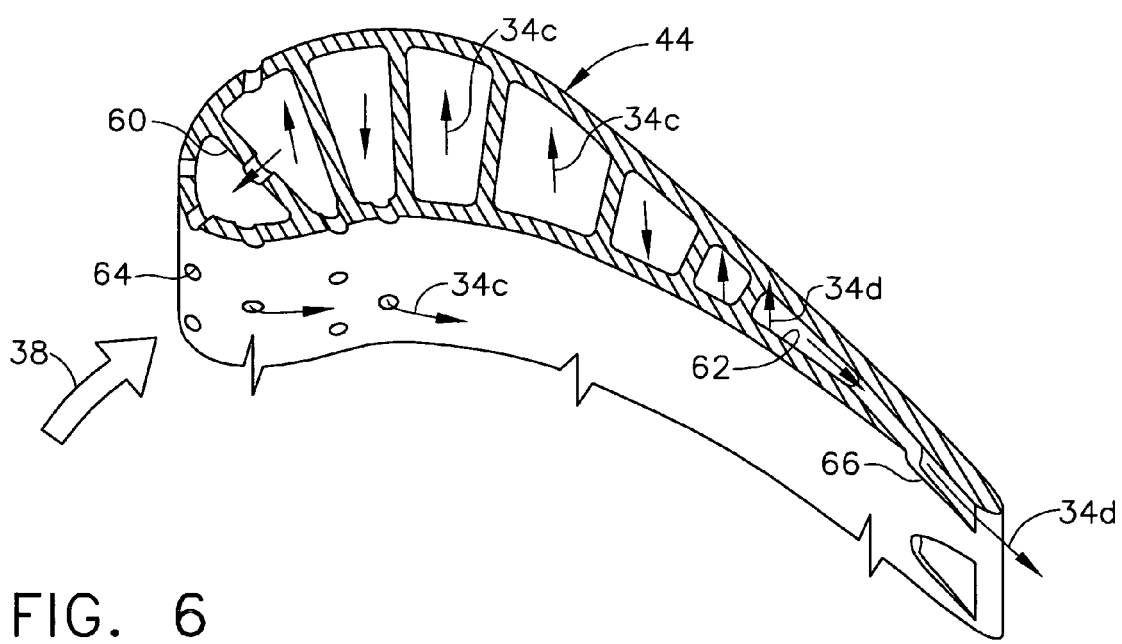
FIG. 6 is a radial sectional view through one of the turbine blades illustrated in FIG. 4 and taken along line 6-6.

Each of the HP blades 44 illustrated in FIGS. 4 and 6 includes a forward cooling channel 60 extending radially in span between the root and tip thereof directly behind the blade leading edge. Each blade also includes an aft cooling channel 62 extending the full span directly in front of the thin trailing edge. And, each blade may include additional cooling channels spaced chordally apart between the leading and trailing edges as desired for providing effective internal cooling thereof during operation.

The blade forward channel 60 feeds one or more rows of cooling holes 64 disposed along the blade leading edge. And, the aft cooling channel 62 feeds another row of cooling holes 66 which terminate in the blade pressure side immediately upstream of the thin trailing edge.

The various rows of outlet holes provided in each turbine blade 44 discharge the spent internal cooling air to form corresponding films of cooling air along the external pressure and suction sides of the blade for enhancing thermal protection thereof, while the trailing edge holes 66 directly discharge spent cooling air at the thin trailing edge of each blade.

The HP vanes 42 may have any conventional internal configuration defining the two internal cooling channels 52,54 therein provided they are independent from each other. For example, each of the two channels 52,54 may include a corresponding conventional impingement baffle having a multitude of impingement holes therein for initially directing pressurized cooling air in impingement against the internal surfaces of the vane. In alternate embodiments, the vane cooling channels 52,54 may be configured in serpentine circuits if desired.

The HP blades 44 may have any suitable internal cooling configuration, and FIGS. 4 and 6 illustrate an exemplary three-pass forward serpentine cooling channel having an inlet at the base of the axial-entry dovetail thereof, and terminating in the forward impingement channel 60 which spans the length of the airfoil directly behind the leading edge. The forward channel 60 feeds one or more rows of the film cooling holes 64 which cover the airfoil leading edge and provide additional film cooling thereof as the spent cooling air is discharged from these holes in typical fashion.

The exemplary turbine blade also includes the independent aft cooling channel 62 which spans the length of the airfoil immediately forward of the thin trailing edge to feed the row of trailing edge cooling holes 66 that discharge spent air along the aft end of the pressure side. The aft cooling channel 62 has a suitable inlet in the aft end of the shank above the dovetail as further described hereinbelow.

In the exemplary configuration illustrated in FIG. 4, the blade 44 also includes a three-pass serpentine middle channel, with a corresponding inlet also in the base of the dovetail.

In this way, pressurized air may be bled from the compressor and channeled through several internal cooling circuits of the blade 44 for providing internal cooling thereof in any conventional manner, with the spent air then being discharged through the various rows of outlet holes found in the pressure and suction sides of the airfoil from the leading edge to the trailing edge.

Whereas the compression stages increase pressure and temperature of the air as energy is added, the turbine stages decrease pressure and temperature of the combustion gases for extracting energy therefrom.

Since the use of a single stage HPT 22 illustrated in FIG. 2 permits a substantial pressure drop to occur in the combustion gases first across the nozzle vanes 42 and then across the turbine blades 44, an improved cooling system for the HPT 22 may be used for further increasing efficiency of the engine.

More specifically, FIG. 2 initially illustrates four independent and discrete bleed circuits 68,70,72,74 suitably joined in flow communication with various stages of the compressor 18 for extracting therefrom pressurized cooling air at suitably different pressures and temperatures.

The first bleed circuit 68 joints the last, or seventh stage 7 of the compressor 18 with the forward cooling channels 52 of the full row of HP nozzle vanes 42 to provide thereto the full pressure, CDP air as a first coolant 34a.

The second bleed circuit 70 joins an intermediate or preultimate stage of the compressor 18 to the aft cooling channels 54 of the full row of HP vanes 42 to provide thereto pre-CDP air as a second coolant 34b.

The third bleed circuit 72 joins the compressor 18 to the forward cooling channels 60 in the full row of HP blades 44 to provide thereto pressurized bleed air as a third coolant 34c under suitable pressure and temperature.

And, the fourth bleed circuit 74 joins another intermediate or preultimate stage of the compressor 18 and the aft cooling channels 62 in the full row of HP blades 44 to provide thereto pre-CDP air as a fourth coolant 34d.

As indicated above, the use of the single stage high pressure turbine illustrated in FIG. 4 permits a substantial reduction in pressure of the combustion gases as they flow downstream during operation across the leading and trailing edges of the HP vanes and blades in turn or sequentially. In order to effectively cool the HP vanes and blades internally, pressurized air must be extracted from the compressor at suitable pressure to maintain adequate backflow margins across the leading and trailing edges of the HP vanes and blades to prevent undesirable ingestion of the hot combustion gases into the various rows of outlet holes in the vanes and blades.

By dividing each of the vanes 42 and blades 44 in axially forward and aft cooling channels, the significant drop in external pressure of the combustion gases may be used to advantage for using non-CDP cooling air inside the vanes and blades and selectively matching internal coolant pressure with external gas pressure to maintain adequate backflow margins.

For example, the second bleed circuit 70 is joined to a suitable stage of the compressor 18 to provide to the vanes 42 the second coolant 34b at a second pressure which is lower than a first pressure of the first coolant 34a. The first coolant 34a is the full pressure CDP air discharged from the compressor to feed the vane forward channels 52 with maximum pressure cooling air to provide an adequate backflow margin at the vane leading edge holes 56 exposed to the combustion gases directly discharged from the combustor.

The second circuit 70 may therefore be joined to a suitable intermediate stage, such as the sixth stage of the compressor following the row of sixth stage compressor blades 6. The second circuit 70 may therefore have any conventional configuration for extracting the sixth stage pressurized air typically at the guide vanes following those blades with a corresponding sixth stage pressure P6 and temperature T6. The sixth stage pressure P6 is less than the last stage pressure P7, and similarly T6 is less than T7.

Correspondingly, the fourth bleed circuit 74 is joined to another intermediate stage of the compressor 18, such as the third stage following the row of third stage compressor blades 3 to extract therefrom the fourth coolant 34d at a corresponding fourth pressure which is lower than the third pressure of the third coolant 34c routed to the forward cooling channels 60 of the same HP blades 44. In the exemplary embodiment illustrated in FIG. 2, the fourth bleed circuit 74 may yet again have a conventional configuration for extracting the pressurized air around the guide vanes immediately following the row of third compressor blades 3 at a corresponding third stage pressure P3 and temperature T3.

In the exemplary configuration illustrated in FIG. 2, the four bleed circuits 68,70,72,74 may be arranged sequentially for extracting pressurized air from the compressor with correspondingly increasing pressure thereof. For example, the fourth circuit 74 may be joined to an earlier stage of the compressor than the second circuit 70 to provide a backflow margin in the fourth coolant 34d at the blade trailing edge holes 66, and a corresponding backflow margin in the second coolant 34b at the vane trailing edge holes 58.

The fourth circuit 74 may therefore join the compressor at the third intermediate stage thereof which precedes the sixth intermediate stage of the compressor from which the second circuit 70 commences.

Similarly, the third bleed circuit 72 may be joined to an earlier stage in the compressor 18 than the first circuit 68 to provide a backflow margin in the third coolant 34c at the blade leading edge holes 64. For example, the third circuit 72 may begin at the fifth compressor stage following the row of fifth stage compressor blades 5 which correspondingly precedes the last stage 7 of the compressor from which the first circuit 68 commences.

In this way, the first circuit 68 receives full pressure CDP coolant 34a to feed the forward channels 52 and leading edge holes 56 in the full row of HP nozzle vanes 42 to provide effective internal cooling thereof, with the spent cooling air being discharged through the leading edge holes with suitable backflow margin and providing external thermally protecting films of air.

The second bleed circuit 70 supplies the lower pressure sixth stage coolant 34b to the aft channels 54 and trailing edge holes 58 in the full row of HP vanes 42 at a correspondingly lower pressure than CDP air, while still effecting an adequate backflow margin with the reduced-pressure combustion gases flowing over the aft portions of the vanes.

The HP vanes 42 are therefore cooled with two different pressure (P7,P6) air coolants, with correspondingly different cooling temperatures (T7,T6).

The third bleed circuit 72 supplies the yet even lower pressure fifth stage coolant 34c to the forward channels 60 and various rows of leading edge holes 64 in the full row of HP blades 44 for enhanced cooling thereof while still effecting suitable backflow margins at the outlet holes.

And, the fourth bleed circuit 74 routes the even lower pressure third stage coolant 34d to the aft channels 62 and trailing edge holes 66 in the full row of HP blades 44, yet again for enhanced cooling thereof while still maintaining adequate backflow margin at these outlet holes.

The HP blades 44 are therefore cooled with two different pressure (P5,P3) air coolants, with the third stage air pressure P3 being less than the fifth stage air pressure P5, and the two coolants having different cooling temperatures (T5,T3).

Not only does the pressure of the bleed air decrease in earlier stages preceding the last stage of the compressor 18, but the corresponding temperatures of the bleed air also decrease. The lower temperature air provided to the HP blades 44 and the aft cooling channels 54 of the HP vanes 42 has greater cooling capacity than the hotter CDP air for increasing cooling efficiency.

And, correspondingly, the use of the pre-CDP bleed air in the three bleed circuits 70,72,74 uses less expensive pressurized air which correspondingly increases efficiency of the HPT 22 and the gas turbine engine itself.

In each of the seven stages of the compressor 18 illustrated in FIG. 2, the static pressure of the air 34 increases substantially. By selecting appropriate intermediate stages of the compressor, the static pressure of the bleed air may be suitably matched to the static pressure in the combustion gases flowing over the HP vanes 42 and blades 44 during operation to ensure suitable backflow margins at all of the outlet holes in the HP stator vanes 42 and the trailing edge outlet holes 66 of the HP blades 44.

However, since the HP blades 44 rotate during operation whereas the nozzle vanes 42 are stationary, the third circuit 72 is suitably configured to effect a static pressure in the third coolant 34c bled from the compressor which is greater than the total relative pressure (PTR) in the combustion gases 38 at the leading edge holes 64 of the HP blades 44 illustrated in FIG. 2. The compressor fifth stage has sufficient static pressure greater than the total relative pressure of the combustion gases at the blade leading edge holes 64 and therefore may be used for providing an effective backflow margin around the blade forward channels 60.

The four bleed circuits 68-74 illustrated schematically in FIG. 2 may have any conventional configuration for extracting the pressurized air from the different stages of the compressor 18 while being suitably modified to discharge the four different coolants 34a-d to the corresponding forward and aft cooling channels of the HP vanes and blades.

For example, the first circuit 68 suitably bypasses the combustor 20 to reach the vane forward channels 52 as shown in FIGS. 2-4.

The second and fourth circuits 70,74 may extend radially outwardly from the compressor 18 outboard of the combustor 20 to reach the corresponding aft channels 54,62 of the vanes 42 and blades 44.

And, the third circuit 72 may extend inboard of the combustor 20 to reach the blade forward channels 60.

In this way, non-CDP air may be used for suitably cooling the HP vanes and blades for enhanced engine efficiency. The pre-CDP air is less expensive than the CDP air since it has not undergone the full compression cycle, and correspondingly, the temperature of the pre-CDP air is substantially less than the temperature of the CDP air by up to hundreds of degrees.

Since the LP nozzle vanes 48 are directly coupled to the first stage HP blades 44, they provide an efficient structure through which the fourth coolant 34d may be channeled.

Accordingly, the fourth circuit 74 may be conveniently routed radially inwardly through one or more of the vanes 48 in the LP nozzle to reach the aft channels 62 of the HP blades 44, while also providing effective cooling of the stator vanes 48 themselves.

As best illustrated in FIG. 3, the HP blades 44 may have any conventional configuration, but are modified for receiving the two sources of pre-CDP air for cooling thereof. The airfoil portion of each blade extends radially in the combustion flowpath which is bound by a radially inner platform of the blade supported from a shank and axial-entry dovetail. Each blade dovetail is suitably mounted in a corresponding axial dovetail slot 76 found in the perimeter rim of the supporting rotor disk 46.

The full row of blades 44 is axially trapped by opposite forward and aft annular blade retainers 78,80. The third circuit 72 may therefore join the row of blades 44 at the forward blade retainer 78 to feed the third coolant 34c, while the fourth circuit 74 may conveniently join the row of blades 44 at the aft blade retainer 80 to feed the fourth coolant 34d under different pressures and temperatures.

The individual blades 44 illustrated in FIG. 4 are typically formed by casting and include internal cooling channels extending the full radial span thereof from the base of the dovetail to the radially outer tip. The forward cooling channel 60, and the middle channel as well, have corresponding inlets at the base of the dovetail disposed in direct flow communication with the dovetail slot 76 for receiving the third coolant 34c from the third circuit 72.

Correspondingly, the aft cooling channel 62 also extends to the base of the dovetail at the aft blade retainer 80, but the cast inlet therein is suitably sealed shut by a thin plate suitably brazed thereto to prevent flow communication with the dovetail slot. Instead, an inlet hole 82 may be cast or drilled in the aft face of the blade shank in flow communication with the aft cooling channel 62 therein for receiving the fourth coolant 34d from the fourth circuit 74.

In this way, the aft cooling channels 62 of the blades have suitable inlets through the shanks thereof at the aft blade retainer 80 which inlets may be conveniently disposed in flow communication with the fourth circuit 74 extending through the LP nozzle vanes 48 and inner band thereof.

The LP nozzle preferably includes an annular aft manifold 84 as shown in FIG. 3 mounted inboard of the inner band below the vanes 48, with an aft flow inducer disposed at the forward end thereof in flow communication with the blade aft channels 62 through the corresponding shank inlets and corresponding apertures through the aft blade retainer. The flow inducer may have any conventional configuration and typically includes a row of vanes for tangentially accelerating the fourth coolant 34d from the stationary aft manifold 84 onto the rotating aft blade retainer and disk. This provides an efficient mechanism for channeling the pressurized fourth coolant 34d to the rotating blades without substantial loss in pressure thereof.

FIGS. 2-4 illustrate that the third circuit 72 may be conveniently disposed inside the first drive shaft 30 which extends axially between the compressor 18 and the HP disk 46. As indicated above, the individual turbine blades 44 have conventional dovetails which are mounted in the corresponding dovetail slots 76 extending axially across the perimeter of the turbine disk 46. The third circuit 72 is preferably configured to channel the third coolant 34c radially outwardly over the forward face of the disk and into the dovetail slots 76 for enhanced cooling of the turbine disk itself.

The combustor 20 illustrated in FIGS. 2 and 3 is supported in a conventional manner radially around an annular inner combustor case 86 which provides circumferentially therearound an inner boundary for the CDP air from the compressor that is used for cooling the radially inner and outer liners of the combustor itself. The third circuit 72 is therefore preferably independent from the CDP air channel surrounding the combustor inner case 86 which may be used in defining the first bleed circuit 68.

The forward blade retainer 78 illustrated in FIG. 3 is an annular plate extending radially along the disk forward face and is spaced axially forward therefrom to define a forward distribution passage or manifold 88 which is disposed in flow communication with the dovetail slots 76 around the disk perimeter. The third circuit 72 continues aft in flow communication with the inner end of the manifold 88.

In this way, the third coolant 34c is channeled radially outwardly through the forward manifold 88 under centrifugal force as the disk 46 rotates during operation to deliver the bleed air into the full row of dovetail slots 76. The retainer plate 78 may include impeller vanes (not shown) inside the manifold 88 for further increasing air pressure if desired.

The turbine disk 46 illustrated in FIG. 3 has the typical wide perimeter rim in which the axial dovetail slots 76 are formed, with a thinner annular web extending radially inwardly therefrom and terminating in a wider central disk hub having a center bore therethrough. The first drive shaft 30 is fixedly joined at an aft flange to the disk web by a row of bolts.

A forward outer seal or secondary hub 90 is integrally joined at the base end of the forward blade retainer 78 and is fixedly mounted in the bolted flanges using the same bolts. Suitable apertures are provided through the junction of the retainer plate 78 and secondary hub 90 to provide flow communication between the forward portion of the third circuit 72 and the manifold 88.

The third circuit 72 is bounded outboard by the drive shaft 30 and is preferably bounded inboard by a tubular baffle which extends axially forwardly from the bore of the secondary hub 90 upstream to the intermediate stage of the compressor.

For example, each of the seven stages of the HP compressor 18 shown in FIG. 2 includes a corresponding compressor rotor disk supporting a corresponding row of the compressor blades 1-7, with corresponding dovetails and dovetail slots in the perimeters of the disks in a conventional configuration. The tubular baffle preferably extends forward to the center bore of the hub of the fifth stage compressor disk in sealing contact therewith.

The third circuit 72 preferably also includes a plurality of circumferentially spaced apart inlet tubes which extend radially inwardly from the base of the fifth stage compressor blades 5 along the corresponding compressor disk to channel the third coolant 34c radially inwardly and axially around the baffle for flow to the outlet manifold 88. The inlet tubes may have a conventional configuration for bleeding interstage pressurized air through corresponding apertures in the compressor rotor between adjacent rows of the compressor blades, preferably in the region of the corresponding row of guide vanes therebetween.

As indicated above, the first circuit 68 may be bound along its radially inner end by the annular inner case 86 disposed inboard of the combustor 20. And, an annular outer case 92 as initially shown in FIG. 2 surrounds the combustor 20 and continues aft around the HP nozzle to define the outer boundary of the first circuit 68. In this way, the inner and outer combustor cases 86,92 provide corresponding annular plenums around the combustor 20 to provide corresponding portions of the first circuit 68 to channel the CDP first coolant 34a into the vane forward channels 52.

As shown in FIG. 4, the outer and inner bands of the HP nozzle may have corresponding inlet apertures therein for channeling the first coolant 34a both radially inwardly and outwardly into the vane forward channels 52 from opposite ends.

As best shown in FIG. 4, a plurality of tubes or spoolies 94 extend radially through the outer case 92 into corresponding ones of the nozzle vanes 42 at their juncture with the outer band to define the outlet end of the second bleed circuit 70 to the corresponding vane aft channels 54. The spoolies 94 separate the second circuit 70 from the first circuit 68 to provide independent flowpaths to the forward and aft cooling channels 52,54 of the HP vanes.

Accordingly, the outer and inner bands of the HP nozzle and the forward portions of each of the HP vanes are cooled by the CDP first coolant 34a discharged from the first circuit 68, while the aft portions of each of the HP vanes are cooled by the lower temperature interstage second coolant 34b provided by the second circuit 70.

FIG. 4 summarizes the improved method of cooling the HP vanes 42 and blades 44 using pressurized air bled from the compressor at different stages, pressures, and temperatures.

The CDP first coolant 34a is bled from the last stage of the compressor 18 to the vane forward channels 52 for discharge from the leading edge cooling holes 56.

The second coolant 34b is bled from the sixth intermediate stage of the compressor to cool the vane aft cooling channels 54 and is discharged from the trailing edge cooling holes 58.

The third coolant 34c is bled from the fifth intermediate stage of the compressor for cooling the blade forward cooling channels 60 and is discharged from the leading edge cooling holes 64 therein.

And, the fourth coolant 34d is bled from the third intermediate stage of the compressor to cool the blade aft channels 62 for discharge from the trailing edge cooling holes 66 thereof.

Since the single stage HPT 22 effects a substantial pressure drop in the combustion gases 38 flowing across the vanes 42 and blades 44 in turn, the second coolant 34b may be bled from the compressor at a substantially lower pressure than the full pressure first coolant 34a, and the fourth coolant 34d may be bled from the compressor at a substantially lower pressure than the third coolant 34c.

The four coolants may therefore be bled from the same compressor 18 at different stages, with the fourth coolant 34d being bled in an earlier stage than the second coolant 34b for providing corresponding backflow margins at the different trailing edge holes 58,66 of both HP vanes 42 and blades 44.

In the preferred embodiment illustrated in FIG. 4, the four coolants 34a-d are bled from the same compressor 18 in independent and discrete flowpaths 68,70,72,74 at four correspondingly different pressures and temperatures. The seven-stage HP compressor 18 permits corresponding matching of the available pressures therein with those required for cooling the HP vanes and blades with suitable backflow margins. More stages in the compressor permits a greater selection from which the different coolants may be obtained.

A fundamental objective in improving efficiency of the turbine and engine is the replacement of the full pressure CDP air by lower pressure interstage air where possible in the high pressure turbine which is otherwise conventionally cooled using the high pressure CDP air. The HP vanes and blades are subject to the hostile environment of the combustion gases 38 first discharged from the outlet of the combustor 20, and the internal coolants of the vanes and blades must be supplied with suitable pressure for obtaining suitable backflow margins around the external surfaces of the vanes and blades.

Correspondingly, any pre-CDP air used for cooling the vanes and blades is inherently substantially cooler than the CDP air and therefore may be used to improve the cooling of the vanes and blades where utilized.

Since the backflow margin requirements at the leading and trailing edges of the turbine blades 44 are based on different pressures, then different sources of bleed air may be selected from the different stages of the compressor for best matching those differences. The choice of the intermediate stage of the compressor is dependent on the compression cycle in the HP compressor 18 and the corresponding expansion cycle in the HPT 22.

Since the HPT 22 is a single-stage turbine, a substantial pressure drop in the combustion gases 38 occurs across the nozzle and blades thereof. Interstage bleed air at a lower pressure than the CDP air may be extracted from the compressor and suitably driven under differential pressure to the HPT while still maintaining a suitable backflow margin with a greater pressure than that of the combustion gases at both leading and trailing edges of the turbine blades 44.

As indicated above, the pressure and temperature of the air 34 increases in steps in each of the seven stages of the HP compressor 18, as represented by the corresponding row of the compressor blades 1-7. The collective or total increase in pressure of the air in the compressor may be quite great and may reach 10-30 atmospheres, for example. Correspondingly, the rise in temperature of the pressurized air 34 across the compressor 18 may be many hundreds of degrees.

By utilizing non-CDP air in the three circuits 70,72,74 disclosed above, a significant reduction in diversion of the CDP air may be obtained with a correspondingly large increase in engine efficiency. Since CDP air is the most expensive air in the engine attributable to the maximum work performed thereon for achieving the high pressure thereof, any diversion thereof from the combustion process itself correspondingly reduces engine efficiency. And, by limiting diversion of CDP air to the first circuit 68 the overall efficiency of the engine may be increased.

In the exemplary embodiment illustrated in FIG. 3, CDP air is not used for cooling the first stage turbine blades or rotor disk, and therefore the conventional flow inducer may be eliminated in this design, which eliminates the corresponding complexity thereof. Instead, a simple annular seal frame 96 extends radially inwardly from the inner case 86 and includes an annular sealing pad in the central bore thereof to sealingly join labyrinth seal teeth extending radially outwardly from the secondary hub 90 above the row of mounting bolts.

The use of non-CDP air for cooling the first stage turbine disk, blades, and aft part of the vanes is significant for the enhanced cooling thereof and for its compounding effect in improving the configuration and overall efficiency of the engine. Since the expensive CDP air is not used for turbine rotor cooling the overall efficiency of the engine increases.

Cooler air is used for cooling the turbine rotor, blades, and vanes which therefore requires less cooling air and also allows for longer component life. A cooler operating turbine rotor may then be formed from less expensive superalloys in view of the lower operating temperature thereof.

The inducer system for the CDP air is eliminated as described above, which simplifies engine design and allows lower weight thereof.

And, the elimination of CDP air for cooling the turbine rotor permits redesign of the HPT itself in conjunction with the compressor 18 and combustor 20 for further increasing the collective efficiency thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine comprising: a fan, compressor, combustor, high pressure turbine, and low pressure turbine disposed in serial flow communication; said compressor including rows of compressor blades for pressurizing air sequentially in corresponding stages; said HP turbine including a row of hollow nozzle vanes having forward and aft internal cooling channels followed by a row of hollow rotor blades having forward and aft internal cooling channels; and first, second, third, and fourth bleed circuits joined in flow communication with different stages of said compressor for bleeding pressurized air therefrom at different pressures to provide first and second coolants to said vane forward and aft channels from correspondingly different stages of said compressor, and third and fourth coolants to said blade forward and aft channels, respectively.

2. An engine according to claim 1 wherein:
said second bleed circuit is joined to said compressor to provide to said vanes said second coolant at a second pressure lower than a first pressure of said first coolant; and
said fourth circuit is joined to said compressor to provide to said blades said fourth coolant at a fourth pressure lower than a third pressure of said third coolant.

3. An engine according to claim 2 wherein:
said vanes and blades include opposite leading and trailing edges with corresponding cooling holes thereat, and are configured for dropping pressure in combustion gases in turn; and
said fourth circuit is joined to said compressor at a stage preceding said second circuit to provide backflow margins at said trailing edge holes of both said vanes and blades.

4. An engine according to claim 3 wherein said third circuit is joined to said compressor at a stage preceding said first circuit to provide a backflow margin at said blade leading edge holes.

5. An engine according to claim 4 wherein said third circuit is configured to effect a static pressure in said third coolant greater than the total relative pressure in said combustion gases at said blade leading edge holes.

6. An engine according to claim 5 wherein:
said compressor includes rows of compressor blades for pressurizing air sequentially in corresponding stages;
said first circuit bypasses said combustor to reach said vane forward channels;
said second and fourth circuits extend radially outwardly from said compressor outboard of said combustor to reach said aft channels of said vanes and blades; and
said third circuit extends inboard of said combustor to reach said blade forward channels.

7. An engine according to claim 5 wherein:
said LP turbine includes a row of first stage LP nozzle vanes directly following said HP blades; and
said fourth circuit is routed radially inwardly through said LP vanes to reach said blade aft channels.

8. An engine according to claim 7 wherein:
said blades are trapped in corresponding dovetail slots in the perimeter of said disk by forward and aft blade retainers;
said third circuit joins said row of blades at said forward blade retainer; and
said fourth circuit joins said row of blades at said aft blade retainer.

9. An engine according to claim 8 wherein:
said blades are joined to said compressor blades by a drive shaft extending inboard of said combustor;
said forward blade retainer extends inwardly along the forward face of said disk to define an annular manifold disposed in flow communication with said dovetail slots around said disk perimeter; and
said third circuit is joined in flow communication with said manifold.

10. An engine according to claim 9 further comprising:
an outer case surrounding said combustor and HP nozzle to define said first circuit from said compressor to said vane forward channels;
a plurality of spoolies extending radially through said outer case to said HP nozzle to define an outlet end of said second circuit to said vane aft channels;
said blade forward channels extending to said dovetail slots for receiving said third coolant from said third circuit; and
said blade aft channels extending aft through the shanks of said blades to said aft blade retainer for receiving said fourth coolant from said fourth circuit.

11. A gas turbine engine comprising:
a multistage compressor disposed in serial flow communication with a combustor and high pressure turbine;
said turbine including a nozzle having a row of stator vanes followed by a row of rotor blades extending from a rotor disk;
each of said vanes including a forward cooling channel feeding leading edge cooling holes, and an aft cooling channel feeding trailing edge cooling holes;
each of said blades including a forward cooling channel feeding leading edge cooling holes, and an aft cooling channel feeding trailing edge cooling holes;
a first bleed circuit joining a last stage of said compressor with said vane forward channels to provide thereto a first coolant;
a second bleed circuit joining an intermediate stage of said compressor and said vane aft channels to provide thereto a second coolant;
a third bleed circuit joining said compressor and said blade forward channels to provide thereto a third coolant; and
a fourth bleed circuit joining an intermediate stage of said compressor and said blade aft channels to provide thereto a fourth coolant.

12. An engine according to claim 11 wherein:
said second bleed circuit is joined to said compressor to provide to said vanes said second coolant at a second pressure lower than a first pressure of said first coolant; and
said fourth circuit is joined to said compressor to provide to said blades said fourth coolant at a fourth pressure lower than a third pressure of said third coolant.

13. An engine according to claim 12 wherein:
said nozzle vanes are configured for dropping pressure in combustion gases across the leading and trailing edges thereof;
said blades are configured for additionally dropping pressure in said combustion gases across the leading and trailing edges thereof; and
said fourth circuit is joined to an earlier stage in said compressor than said second circuit to provide a backflow margin in said fourth coolant at said blade trailing edge holes and a backflow margin in said second coolant at said vane trailing edge holes.

14. An engine according to claim 13 wherein said third circuit is joined to an earlier stage in said compressor than said first circuit to provide a backflow margin in said third coolant at said blade leading edge holes.

15. An engine according to claim 13 wherein said third circuit is configured to effect a static pressure in said third coolant greater than the total relative pressure in said combustion gases at said blade leading edge holes.

16. An engine according to claim 13 wherein:
said compressor includes rows of compressor blades for pressurizing air sequentially in corresponding stages;
said first circuit bypasses said combustor to reach said vane forward channels;
said second and fourth circuits extend radially outwardly from said compressor outboard of said combustor to reach said aft channels of said vanes and blades; and
said third circuit extends inboard of said combustor to reach said blade forward channels.

17. An engine according to claim 16 further comprising:

a low pressure turbine following said HP turbine in serial flow communication, and including a row of first stage LP nozzle vanes directly following said HP blades; and said fourth circuit is routed radially inwardly through said LP nozzle vanes to reach said aft channels of said HP blades.

18. An engine according to claim 17 wherein:

said blades are trapped in corresponding dovetail slots in the perimeter of said disk by forward and aft blade retainers;

said third circuit joins said row of blades at said forward blade retainer; and said fourth circuit joins said row of blades at said aft blade retainer.

19. An engine according to claim 18 wherein:

said blades are joined to said compressor blades by a drive shaft extending inboard of said combustor;

said forward blade retainer extends inwardly along the forward face of said disk to define an annular manifold disposed in flow communication with said dovetail slots around said disk perimeter; and said third circuit is joined in flow communication with said manifold.

20. An engine according to claim 19 wherein:

said blade forward channels extend to said dovetail slots for receiving said third coolant from said third circuit; and said blade aft channels extend aft through the shanks of said blades to said aft blade retainer for receiving said fourth coolant from said fourth circuit.

21. An engine according to claim 20 further comprising:

an outer case surrounding said combustor and HP nozzle to define said first circuit from said compressor to said vane forward channels; and a plurality of spoolies extending radially through said outer case to said HP nozzle to define an outlet end of said second circuit to said vane aft channels.

22. A method of cooling nozzle vanes and rotor blades in a high pressure turbine comprising:

bleeding a first coolant between the last stage of a multi-stage compressor and a forward cooling channel in said vanes for discharge from leading edge cooling holes therein;

bleeding a second coolant between an intermediate stage of said compressor and an aft cooling channel in said vanes for discharge from trailing edge cooling holes therein;

bleeding a third coolant between said compressor and a forward cooling channel in said blades for discharge from leading edge cooling holes therein; and bleeding a fourth coolant between an intermediate stage of said compressor and an aft cooling channel in said blades for discharge from trailing edge cooling holes therein.

23. A method according to claim 22 further comprising:

dropping pressure in combustion gases across said vanes and blades in turn;

bleeding from said compressor said second coolant at a lower pressure than said first coolant, and said fourth coolant at a lower pressure than said third coolant; and bleeding said fourth coolant from said compressor earlier than said second coolant for providing backflow margins at said trailing edge holes of both said vanes and blades.

24. A method according to claim 23 further comprising bleeding said first, second, third, and fourth coolants from said compressor in independent flowpaths at correspondingly different pressures and temperatures.

* * * * *